(12) United States Patent
Saito et al.

(10) Patent No.: US 6,494,926 B1
(45) Date of Patent: Dec. 17, 2002

(54) FUEL CELL SEPARATOR AND PRODUCTION METHOD THEREOF

(75) Inventors: Kazuo Saito, Chiba (JP); Atsushi Hagiwara, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 80 days.

(21) Appl. No.: 09/658,527

(22) Filed: Sep. 9, 2000

(30) Foreign Application Priority Data

Sep. 22, 1999 (JP) ............................................ 11-267961

(51) Int. Cl.$^7$ .......................... H01M 8/02; B29C 73/00; B29B 17/00
(52) U.S. Cl. ........................... 29/623.1; 429/34; 429/49; 264/105; 264/36.18; 264/37.1; 264/37.29
(58) Field of Search .................... 429/34, 49; 29/623.1; 427/115; 264/29.1, 36.18, 37.1, 37.29, 104, 105, 911, 915

(56) References Cited

FOREIGN PATENT DOCUMENTS

| JP | 62-171908 | * | 7/1987 |
| JP | 10-255823 | * | 9/1998 |
| JP | 2000-223133 | * | 8/2000 |

* cited by examiner

Primary Examiner—Patrick Ryan
Assistant Examiner—Jonathan Crepeau
(74) Attorney, Agent, or Firm—Muramatsu & Associates (57) ABSTRACT

A fuel cell separator made of conductive material and resin wherein the conducive material is recycled from waste of fuel cell separators. The fuel cell separator consisting of conductive material and resin is made by using the waste of fuel cell separator consisting of conductive material and resin. The waste of fuel cell separator is pulverized to powder and is mixed with unused resin and, if necessary, supplemental conductive material, to establish powdered material. The powdered material is molded under the predetermined molding pressure and temperature. The fuel cell separators using the recycled material are comparable to fuel cell separators made solely from new material. In another aspect, a method of producing a fuel cell separator using the recycled material is disclosed.

9 Claims, 7 Drawing Sheets

Fig. 1(a)

| | Sample 1 | Sample 2 | Sample 3 | Sample 4 | Sample 5 | Sample 6 |
|---|---|---|---|---|---|---|
| Type of Fuel Cell Separator Waste — Graphite & Resin | Yes | Yes | Yes | Yes | Yes | Yes |
| Type of Fuel Cell Separator Waste — Carbon & Resin | | | | | | |
| Waste Based Carbon Powder | 100 | 100 | 100 | 100 | 100 | 100 |
| Scale Graphite (Average size 30μm) | 0 | 0 | 0 | 0 | 0 | 100 |
| Phenol Resin | 5 | 10 | 25 | 40 | 70 | 25 |
| Moldability | Good | Good | Good | Good | Good | Good |
| Specific Resistance (mΩ·cm) | 9 | 9 | 12 | 25 | 50 | 12 |
| Flexural Strength (MPa) | 20 | 28 | 33 | 39 | 20 | 34 |

Fig. 1(b)

| | | Sample 7 | Sample 8 | Sample 9 | Sample 10 | Sample 11 | Sample 12 | Sample 13 |
|---|---|---|---|---|---|---|---|---|
| Type of Fuel Cell Separator Waste | Graphite & Resin | Yes | Yes | | | | | |
| | Carbon & Resin | | | Yes | Yes | Yes | Yes | Yes |
| Waste Based Carbon Powder | | 100 | 100 | 100 | 100 | 100 | 100 | 100 |
| Scale Graphite (Average size 30μm) | | 450 | 900 | 0 | 0 | 0 | 0 | 0 |
| Phenol Resin | | 25 | 25 | 5 | 10 | 25 | 40 | 70 |
| Moldability | | Good | Good | Good | Good | Good | Good | Good |
| Specific Resistance | (mΩ·cm) | 12 | 11 | 9 | 9 | 12 | 25 | 50 |
| Flexural Strength | (MPa) | 35 | 33 | 22 | 30 | 35 | 30 | 20 |

Fig. 2(a)

| | | Sample 14 | Sample 15 | Sample 16 | Sample 17 | Sample 18 | Sample 19 |
|---|---|---|---|---|---|---|---|
| Type of Fuel Cell Separator Waste | Graphite & Resin | Yes | Yes | Yes | Yes | Yes | Yes |
| | Carbon & Resin | | | | | | |
| Waste Based Carbon Powder | | 100 | 100 | 100 | 100 | 100 | 100 |
| Scale Graphite (Average size 30μm) | | 0 | 100 | 450 | 900 | 0 | 0 |
| Resin | Epoxy | 25 | 25 | 25 | 25 | | |
| | Diallyl Phthalate | | | | | 25 | |
| | Polypropylene | | | | | | 25 |
| | Silicon Rubber | | | | | | |
| Moldability | | Good | Good | Good | Good | Good | Good |
| Specific Resistance | (mΩ·cm) | 15 | 15 | 16 | 15 | 18 | 22 |
| Flexural Strength | (MPa) | 29 | 27 | 25 | 29 | 28 | 25 |

Fig. 2(b)

| | | Sample 20 | Sample 21 | Sample 22 | Sample 23 | Sample 24 |
|---|---|---|---|---|---|---|
| Type of Fuel Cell Separator Waste | Graphite & Resin | Yes | | | | |
| | Carbon & Resin | | Yes | Yes | Yes | Yes |
| Waste Based Carbon Powder | | 100 | 100 | 100 | 100 | 100 |
| Scale Graphite (Average size 30μm) | | 0 | 0 | 0 | 0 | 0 |
| Resin | Epoxy | | 25 | | | |
| | Diallyl Phthalate | | | 25 | | |
| | Polypropylene | | | | 25 | |
| | Silicon Rubber | 25 | | | | 25 |
| Moldability | | Good | Good | Good | Good | Good |
| Specific Resistance | (mΩ·cm) | 20 | 14 | 17 | 20 | 19 |
| Flexural Strength | (MPa) | 25 | 30 | 28 | 26 | 29 |

Fig. 3(a)

| | | Sample 25 | Sample 26 | Sample 27 | Sample 28 | Sample 29 | Sample 30 | Sample 31 |
|---|---|---|---|---|---|---|---|---|
| Type of Fuel Cell Separator Waste | Graphite & Resin | Yes | Yes | Yes | Yes | Yes | Yes | Yes |
| | Carbon & Resin | | | | | | | |
| Baking Temperature of Crushed Waste (°C) | | 500 | 1200 | 2200 | 3000 | 1200 | 1200 | 1200 |
| Waste Based Carbon Powder | | 100 | 100 | 100 | 100 | 100 | 100 | 100 |
| Scale Graphite (Average size 30μm) | | 0 | 0 | 0 | 0 | 100 | 450 | 900 |
| Phenol Resin | | 25 | 25 | 25 | 25 | 25 | 25 | 25 |
| Moldability | | Good | Good | Good | Good | Good | Good | Good |
| Specific Resistance (mΩ·cm) | | 9 | 9 | 10 | 8 | 10 | 11 | 13 |
| Flexural Strength (MPa) | | 45 | 43 | 41 | 40 | 44 | 45 | 44 |

Fig. 3(b)

| | | Sample 32 | Sample 33 | Sample 34 | Sample 35 | Sample 36 | Sample 37 |
|---|---|---|---|---|---|---|---|
| Type of Fuel Cell Separator Waste | Graphite & Resin | | | | | | |
| | Carbon & Resin | Yes | Yes | Yes | Yes | Yes | Yes |
| Baking Temperature of Crushed Waste | (°C) | 500 | 1200 | 2200 | 3000 | 450 | 900 |
| Waste Based Carbon Powder | | 100 | 100 | 100 | 100 | 100 | 100 |
| Scale Graphite (Average size 30μm) | | 0 | 0 | 0 | 0 | 450 | 900 |
| Phenol Resin | | 25 | 25 | 25 | 25 | 25 | 25 |
| Moldability | | Good | Good | Good | Good | Good | Good |
| Specific Resistance | (mΩ·cm) | 9 | 9 | 9 | 8 | 11 | 13 |
| Flexural Strength | (MPa) | 45 | 43 | 42 | 40 | 45 | 44 |

FUEL CELL SEPARATOR AND PRODUCTION METHOD THEREOF

FIELD OF THE INVENTION

This invention relates to a fuel cell separator and its production method, and more particularly, to a fuel cell separator made of conductive material and resin wherein the conducive material is recycled from waste of fuel cell separators, and to a method of producing a fuel cell separator using the material recycled from the waste of fuel cell separators.

BACKGROUND OF THE INVENTION

A fuel cell which generates electric power by making use of fuel gas and oxidant gas, especially a solid polymer type fuel cell, is considered to be a new clean energy source in various applications including automobiles. A solid polymer fuel cell is configured in such a way that an ion conductive solid electrolyte membrane is sandwiched by an anode and a cathode each having a catalyst and functioning as a gas diffusion electrode, and an outside of each electrode is further provided with a fuel cell separator. The fuel cell separator at the anode provides hydrogen as fuel gas, and the fuel cell separator at the cathode provides oxygen as oxidizer gas.

Figure 4A:
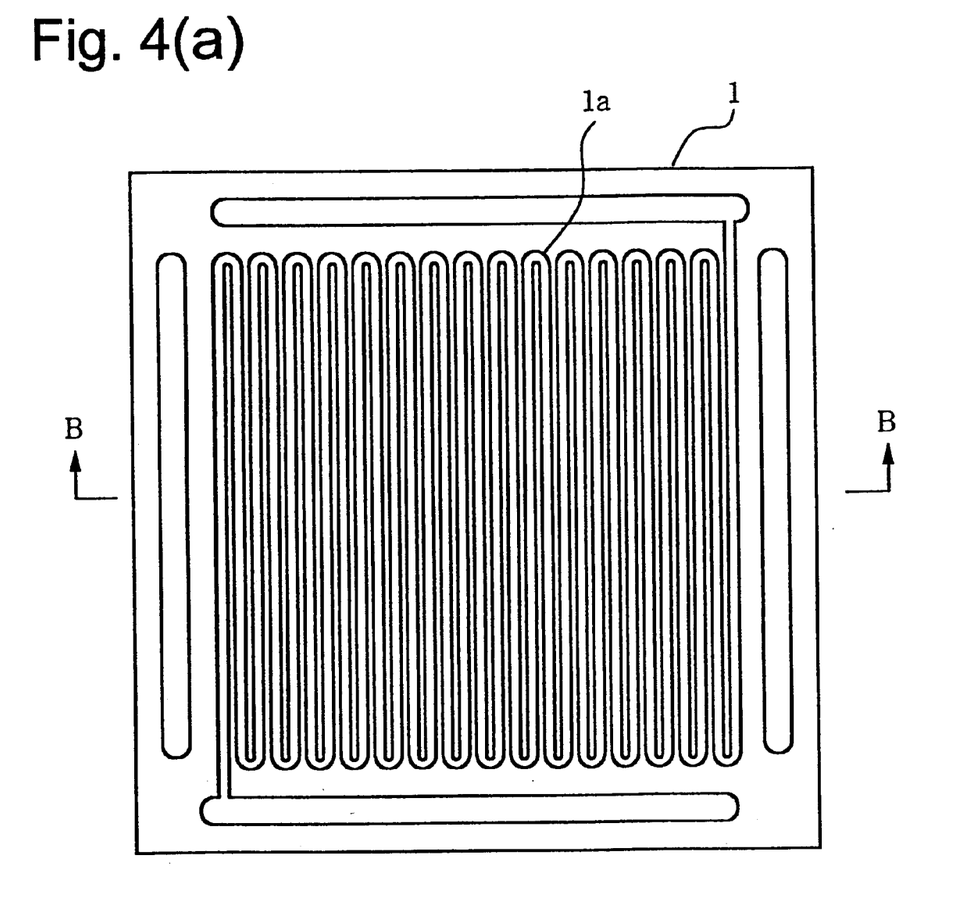
FIG. 4(a) is a plan view thereof and FIG. 4(b) is a cross sectional view taken along the B—B line of FIG. 4(a).
Figure 4B:
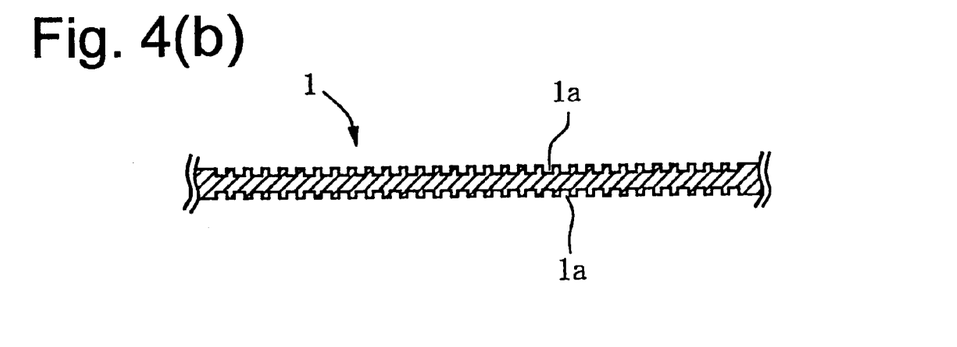

FIGS. 4(a) and 4(b) show an example of such a fuel cell separator. As shown in FIGS. 4(a) and 4(b), on a fuel cell separator 1, narrow channels 1a are formed on a planar surface thereof. In order to increase an overall surface area for connecting between the gas diffusion electrode and the gas, the channels 1a are meandering with a small pitch on the whole surface of the fuel cell separator. The channels 1a may be formed on both surfaces of the fuel cell separator as shown in FIG. 4(b), or may be formed only on one surface of the fuel cell separator.

There are other types of structures of the fuel cell separator wherein both surfaces or one surface is provided with a large number of projections where spaces between those projections are used as passages of the gas, or both surfaces or one surface is provided with combinations of such projections and channels.

Since the fuel cell separators described above use a large amount of carbon material, a problem arises when such fuel cells are wasted because of their life times or other reasons. Because the waste of the fuel cell separators include a large amount of carbon material as noted above, how to deal with such industrial waste is an important subject in the fuel cell industry.

In this respect, Japanese Patent Laid-Open Publication No. 10-255823 appears to disclose a structure of a fuel cell separator related to this problem. In this patent publication, it is stated that a conventional fuel cell separator made of carbon based bulk material such as artificial graphite or vitrified carbon has drawbacks in that it tends to be damaged by mechanical shocks or vibrations because of its low toughness and it is difficult to recycle. The patent publication proposes a fuel cell separator made of metal which includes aluminum or titanium as base material in a weight ratio of 80% or higher on which a layer of conductive carbon is provided. It is stated, as an effect of the invention, that recycling of the fuel cell separators has become easy because of the structure of the structure thereof.

Although no description is given in this patent publication as to the method of recycling the fuel cell separators, there is a recitation stating that "aluminum is especially preferable for this purpose because of its characteristics of easy recycling, easy machining, and low cost". Based on this recitation, it is assumed that the invention in this patent publication is directed only to the recycling of the metal components in the fuel cell separator.

In contrast, as noted in the foregoing, the present invention relates to a fuel cell separator which is made of resin and conductive material such as carbon. This fuel cell separator in the present invention is the type of separator designated in the above Japanese Patent Laid-Open Publication No. 10-255823 as the one having the carbon based bulk material and is considered difficult to recycle.

SUMMARY OF THE INVENTION

The present invention reflects on the aforementioned facts and conventional technology. It is, therefore, an object of the present invention to provide a fuel cell separator and its production method which can easily recycle the waste of fuel cell separator containing conductive material and resin.

It is another object of the present invention to provide a fuel cell separator and its production method which is capable of decreasing the industrial waste involving the fuel cell separators, thereby improving environmental conditions and saving natural resources.

It is a further object of the present invention to provide a fuel cell separator and its production method which is capable of using the material obtained from the waste of fuel cell separators where the content of the material is always known, thereby enabling to produce fuel cell separators of uniform and high quality.

In order to achieve the objectives above, the fuel cell separator made of conductive material and resin is comprised of conductive material at least a part of which is powdered material made by pulverizing the waste of fuel cell separator which contains conductive material and resin.

The waste of fuel cell separator is converted to carbon or graphite through a baking process which is conducted under baking temperature ranging from 500° C. to 3,000° C. The conductive material includes carbon powder which has an average diameter ranging from 10 $\mu$m to 100 $\mu$m. Preferably, the average diameter of the carbon powder is about 30 $\mu$m.

Another aspect of the present invention is a method of producing a fuel cell separator which is comprised of a step of crushing the waste of unbaked fuel cell separator containing conductive material and resin, a step of supplementing unused conductive material and/or resin to the crushed waste of unbaked fuel cell separator to form powdered material; and a step of molding the powdered material by a mold under a predetermined molding pressure and temperature to form the fuel cell separator.

Preferably, the production method further includes a step of baking the waste of fuel cell separator, either before or after the crushing step, under baking temperature ranging from 500° C. to 3,000° C. An environmental gas may be supplied to the powdered material in the baking step. Preferably, the production method further includes a step of adding solvent to the powdered material to granulate the powdered material.

BRIEF DESCRIPTION OF THE DRAWINGS

FIG. 4 shows an example of fuel cell separator where

DETAILED DESCRIPTION OF PREFERRED EMBODIMENTS

The embodiments of the present invention will be explained in detail with reference to the accompanying drawings. As mentioned in the foregoing, the present invention is directed to the technology for recycling the waste of fuel cell separators. Here, within the context of this specification, the term "waste of fuel cell separators" includes (1) fuel cell separators that had been used in fuel cells and then wasted because, for example, of the life time of the fuel cells, (2) fuel cell separators found defective in the production process thereof, and (3) scraps and debris resulted in the production stage of the fuel cell separators such as burrs left as a result of machining the fuel cell separators after the molding process.

A brief description is given in the following regarding a basic process of producing fuel cell separators. In the example of fuel cell separators having carbon as conductive material, ordinarily, the powder of carbon is mixed with resin for the purpose of improving the conductivity as well as increasing a mechanical strength of the fuel cell separator. One or more kinds of resin are selected from the group of thermosetting resin, thermoplastic resin, rubber and the like, and added to the carbon powder. If necessary, an additive is further provided to the mixed material such as a dispersion agent, an internal mold release agent, a curing agent, stabilizer, and thickener. The material prepared in this manner is molded to an intended shape, through a molding process such as injection molding, compression molding, extrusion molding, and the like.

Various kinds of carbon powder can be used as the conductive material for the fuel cell separator. An example of such powdered carbon material includes scale graphite, natural graphite, artificial graphite, acetylene black, carbon black, ketjen black and kish graphite. Thus, one or more kinds of carbon listed above are selected and are mixed in the material in a powdered form.

Because the fuel cell separator needs to be conductive, in the example of material noted above, the carbon accounts for 70–95% of the overall material while the resin and additive account for the remaining 5–35% of the material. In other words, the main constituent of the fuel cell separator is the carbon.

The fuel cell separators are incorporated in the fuel cell. The fuel cell has a life time and will be wasted after passing the life time. However, since the fuel cell separator is made of carbon as its main component, there is no life time of its own. Thus, the fuel cell separator can be used after elapsing the life time of the fuel cell. However, the shape of the fuel cell separator must be strictly dependent upon the shape of the fuel cell, thus, old fuel cell separators cannot be used as they are in a new fuel cell having a different shape.

Therefore, in the present invention, the fuel cell separators are recycled in the following manner. In the first production method of the present invention for producing the fuel cell separator, the waste of the fuel cell separator having the carbon and resin as the main constituent is pulverized into powder to be used as conductive material of a new fuel cell separator.

The method of pulverizing the waste can be any industrially used methods known today for crushing the objects, such as using a shredder, a jet mill, a hammer mill, and a ball mill. Preferably, the waste based carbon powder thus produced has an average grain size or diameter in the range of 10–100 $\mu$m. To regulate the grain size within 10–100 $\mu$m, a classification process may be incorporated to select the size of the pulverized carbon powder.

The reason for regulating the average grain size of the carbon powder in the range of 10–100 $\mu$m is that the carbon powder having a diameter of 10 $\mu$m or greater has a higher adhesive strength on its surface with respect to the resin, thereby improving affinity with newly added resin and carbon material. The carbon material having a diameter of 100 $\mu$m or smaller is advantageous in that it substantially improves gas non-permeability which is one of basic requirements of the fuel cell separator, as well as it increases the mechanical strength of the fuel cell separator.

The waste based carbon powder obtained in the foregoing process is mixed, if necessary, with new resin and new (unused) carbon powder. The method of mixing the material can be any industrially used mixing methods known today, such as using a stirring rod, a kneader, a mixer, a static mixer, a Henshel mixer, an Eirich Mixer, Lödige mixer, and a ribbon mixer.

Further, if necessary for improving the workability, solvent may be added to granulate the mixed material. An example of such solvent includes water, methanol, ethanol, isopropyl alcohol, butanol, toluene, xylene, methyl ethyl ketone, and acetone, although not limited to this example. The solvent may be 40% or less, preferably less than 20% of the solid material. In the case where the solvent is more than 40%, not only it becomes difficult to granulate the material but also it requires an extended drying time, resulting in increase in the cost. The size of the granule is 0.03–3 mm, preferably within the range of 0.1–1 mm.

The fuel cell separator is formed through a molding process by using the mixed material obtained as noted above. An example of molding includes various conventionally known molding methods such as injection molding, injection compression molding, compression molding, extrusion molding, roll molding, and hydraulic pressure molding.

In the above molding process, molding temperature, molding pressure and molding time are determined based on the characteristics of the resin included in the mixed material. Such characteristics of the resin includes hardening, melting and curing temperature and other conditions. For chemically stabilizing the fuel cell separator, it may be further undergone a heat treatment with high temperature.

In the second production method of the present invention for producing the fuel cell separator, the waste of the fuel cell separator having the carbon powder and resin as the main constituent is pulverized into a powdered form and then is baked under the high temperature of 500–3,000° C. The resultant carbon powder is used as conductive material of a new fuel cell separator. It should be noted that such a baking process can be conducted before pulverizing the waste of fuel cell separator. The method of pulverizing the waste of the fuel cell and the average grain size of the carbon powder thus obtained are the same as that of the first production method described above.

For the baking (firing), any type of heating furnaces which are commonly employed in the industry can be used in the present invention, and such a heating furnace can be a batch heating furnace or a continuous heating furnace. After the baking process, an additional process of crushing and classification can be performed for regulating the grain size of the carbon powder within 10–100 μm.

During the baking process noted above, any types of environmental gas which is able to improve the affinity of the waste based carbon powder can be used. An example of such an environmental gas includes air, argon, nitrogen, oxygen, propane, steam, helium, and chlorine. Thus, one type of gas or a mixture of two or more types of gas selected from the above example can be used in the baking process.

As to the baking (firing) temperature, the temperature of 500° C. or higher is advantageous in that the affinity at the surfaces of the carbon powder increases while also improving the conductivity. The temperature of 3,000° C. or lower is advantageous in that the exhaustion of the baking furnace can be avoided, thereby enabling to prepare the material of fuel cell separators with low cost.

The purpose of baking the waste based carbon powder is based on the fact that such carbon powder has the resin sufficiently distributed on the surface thereof. Thus, by baking the carbon powder under the environment of 500–3,000° C., the resin adhered to the surface of the carbon powder is converted to carbon or graphite, thereby improving the affinity with the newly added resin and carbon material. As a result, the moldability is further improved. Moreover, with use of this material, it is also possible to produce a fuel cell separator having an improved mechanical strength.

Generally, when repeating the recycling procedure many times, there arises a problem in that the content of the resin and additives increases or the content of the resin varies from the waste to waste. In the second embodiment of the present invention, however, since the powder made from the waste of the fuel cell separator is undergone the baking process, all of the resin and additives in the powder are converted to the carbon powder, thereby making the content in the waste based material uniform.

The carbon powder produced through the foregoing procedure using the waste of the fuel cell separator is mixed with resin and, if necessary, unused carbon powder as well. The mixing process is the same as that in the first embodiment described above. For improving the workability, if necessary, solvent may be added to the mixed material to form granulated powder in the same manner as that in the first embodiment described above.

Experimental Results

Experiments have been conducted for samples 1–37 with respect to various parameters which are shown in FIGS. 1(A) and 1(b), FIGS. 2(a) and 2(b), and FIGS. 3(a) and 3(b).

Sample 1–13

Figure 1A:
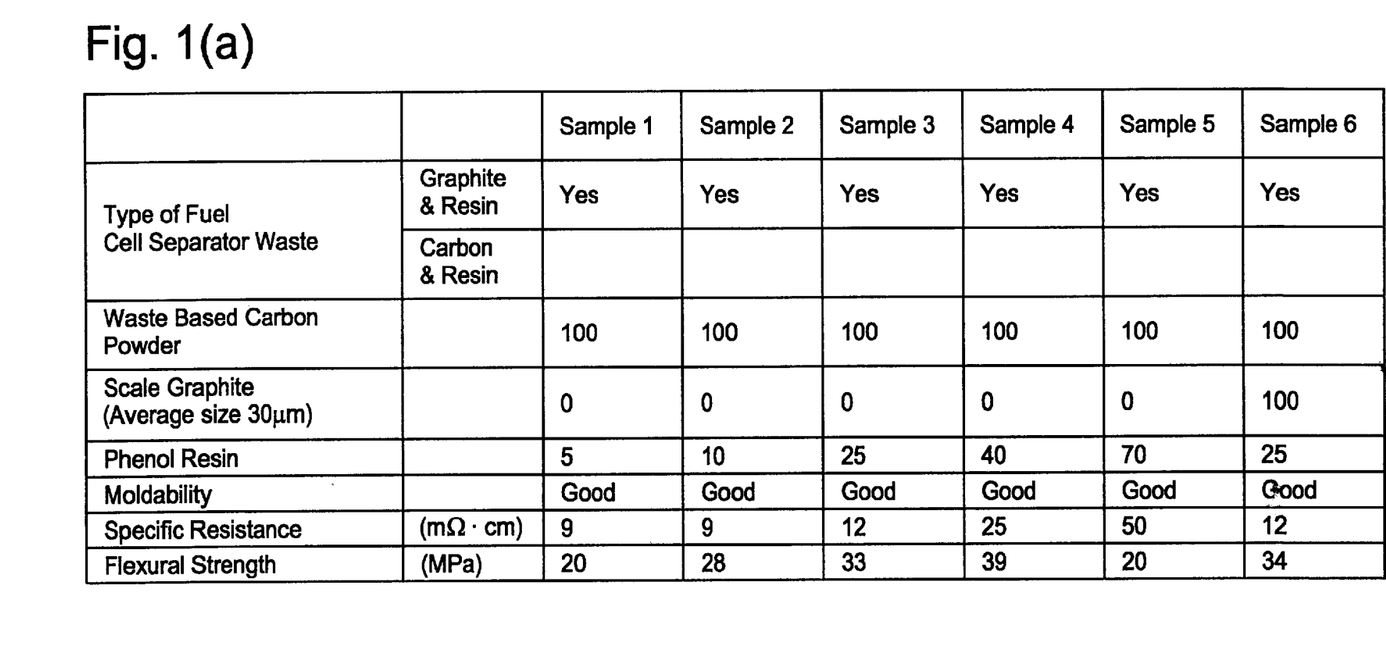
FIGS. 1A and 1B are data tables showing experimental results with respect to samples 1–13 of fuel cell separators using the material having carbon powder made by pulverizing the waste of fuel cell separator which is mixed with phenol resin.
Figure 1B:
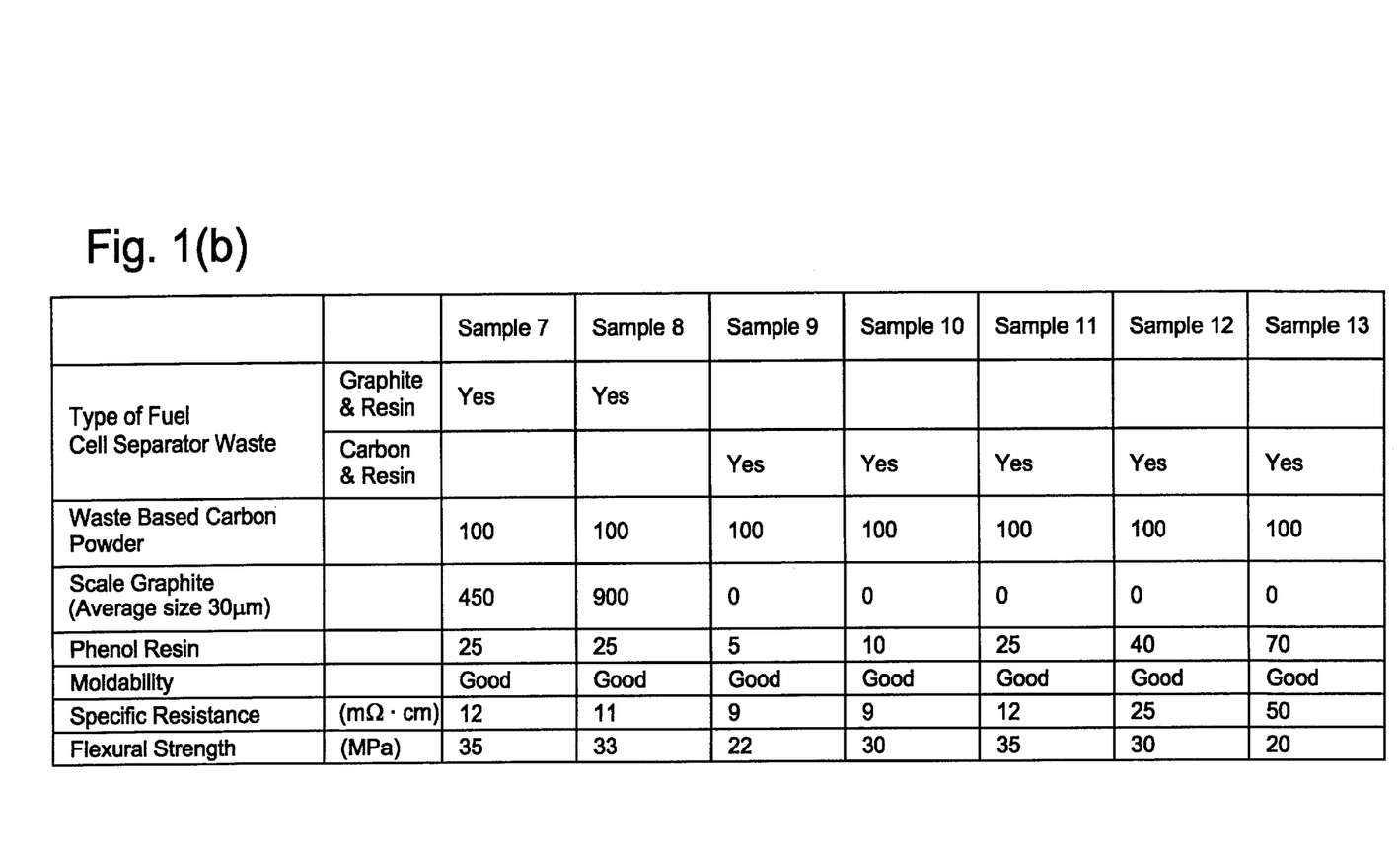

In the data table shown in FIGS. 1(a) and 1(b), each of the fuel cell separators in the samples 1–13 is directed to the material which is a mixture of the waste based carbon powder and phenol resin. In this experiment, the waste of fuel cell separator is crushed by a jet mill to produce the waste based carbon powder with an average grain size of 30 μcm. The waste based carbon powder is mixed with unused scale graphite (average grain size of 30 μm). The waste based carbon powder in the overall conducive material is "100" in weight throughout the samples 1–13.

In FIGS. 1(a) and 1(b), the samples 1–8 use the carbon powder recycled from the fuel cell separator containing the graphite and resin while the samples 9–13 use the carbon powder recycled from the fuel cell separator containing the carbon and resin. No new graphite is added to the samples 1–6 while the new graphite is added to the samples 6, 7 and 8. Especially, a large amount of scale graphite is added to the samples 7 and 8 as shown in FIG. 1(b). Further, the resin (phenol resin) is mixed with the conductive material (mixture of waste based carbon powder and scale graphite) by a Henshel mixer in the ratio defined in the data tables.

The material thus prepared is undergone the molding process under the molding temperature of 150° C., compression pressure of 14.7 MPa, compression time of five (5) minutes with use of a compression mold. The resultant fuel cell separator in each of the samples 1–13 has a thickness of 2 mm on which a plurality of flow paths each having a depth of 1 mm and a width of 1 mm are formed. Moldability, specific resistance, and a flexural strength for each sample are also measured and listed in the data tables. The moldability is judged based on visual inspection, and the flexural strength is measured based on the test method described in the Japanese Industrial Standard JIS K6911.

The phenol resin is to promote adhesion of the carbon powder in the molding process. If the phenol resin is insufficient, it makes impossible to mold the fuel cell separator or decreases the flexural strength of the fuel cell separator. The sample 8 shows the weight ratio of 2.4%, which is considered to be the lowest possible value of the phenol resin.

In contrast, if the phenol resin in the mixed material is excessive, although the moldability and flexural strength will improve, specific resistance in the fuel cell separator increases, which causes a problem in the performance of the fuel cell. The samples 5 and 13 show the weight ratio of about 40%, resulting in the specific resistance of 50 mΩ·cm, which is considered to be the highest limit of the phenol resin.

All of the samples 1–13 show excellent moldability and flexural strength, and the specific resistance of each sample is low enough for the practical use in the fuel cell. Therefore, the fuel cell separators of the present invention in FIGS. 1(a) and 1(b) are comparable to fuel cell separators made solely from new material.

Sample 14–24

Figure 2A:
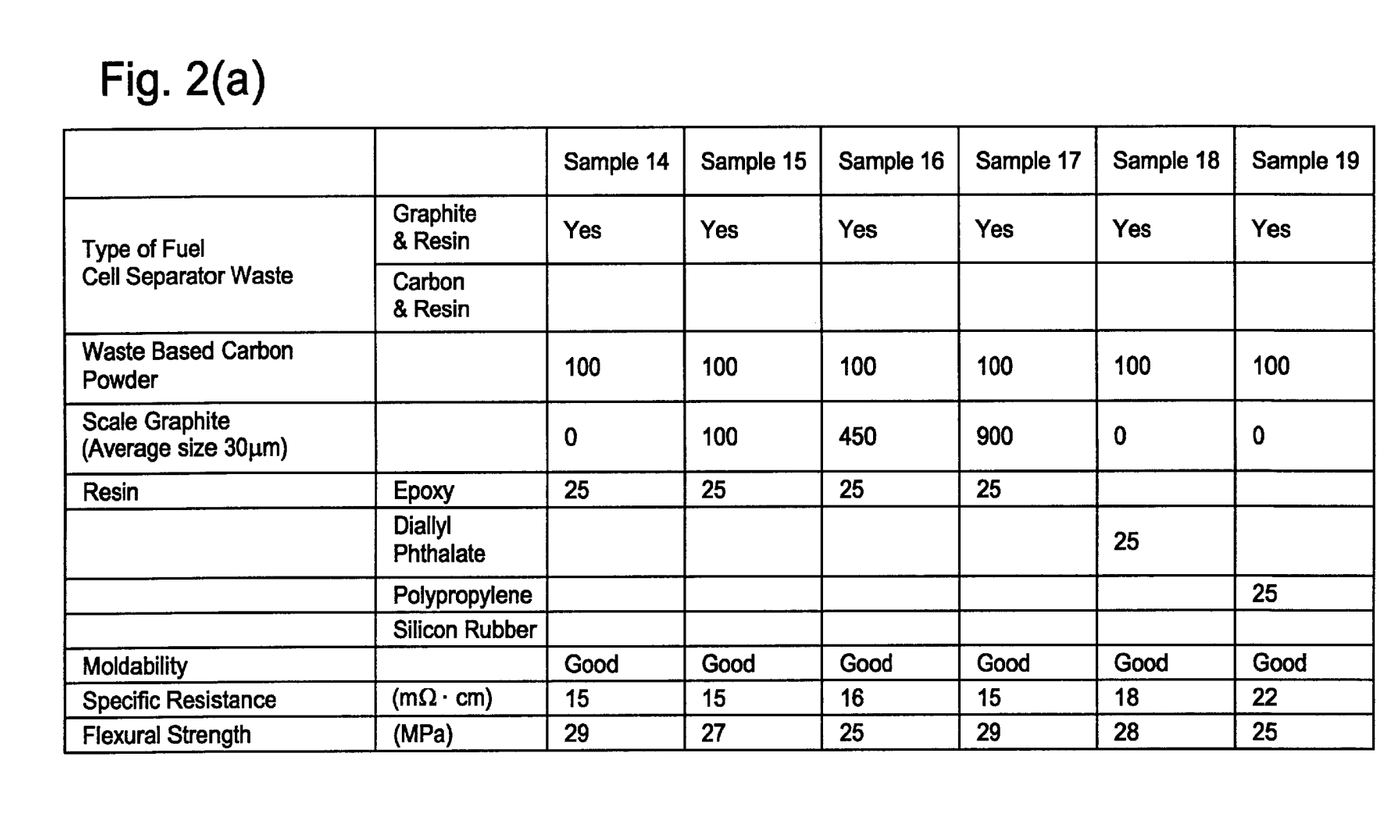
FIGS. 2A and 2B are data tables showing experimental results with respect to samples 14–24 of fuel cell separators using the material having carbon powder made by pulverizing the waste of fuel cell separator which is mixed with a selected one of various types of resin.
Figure 2B:
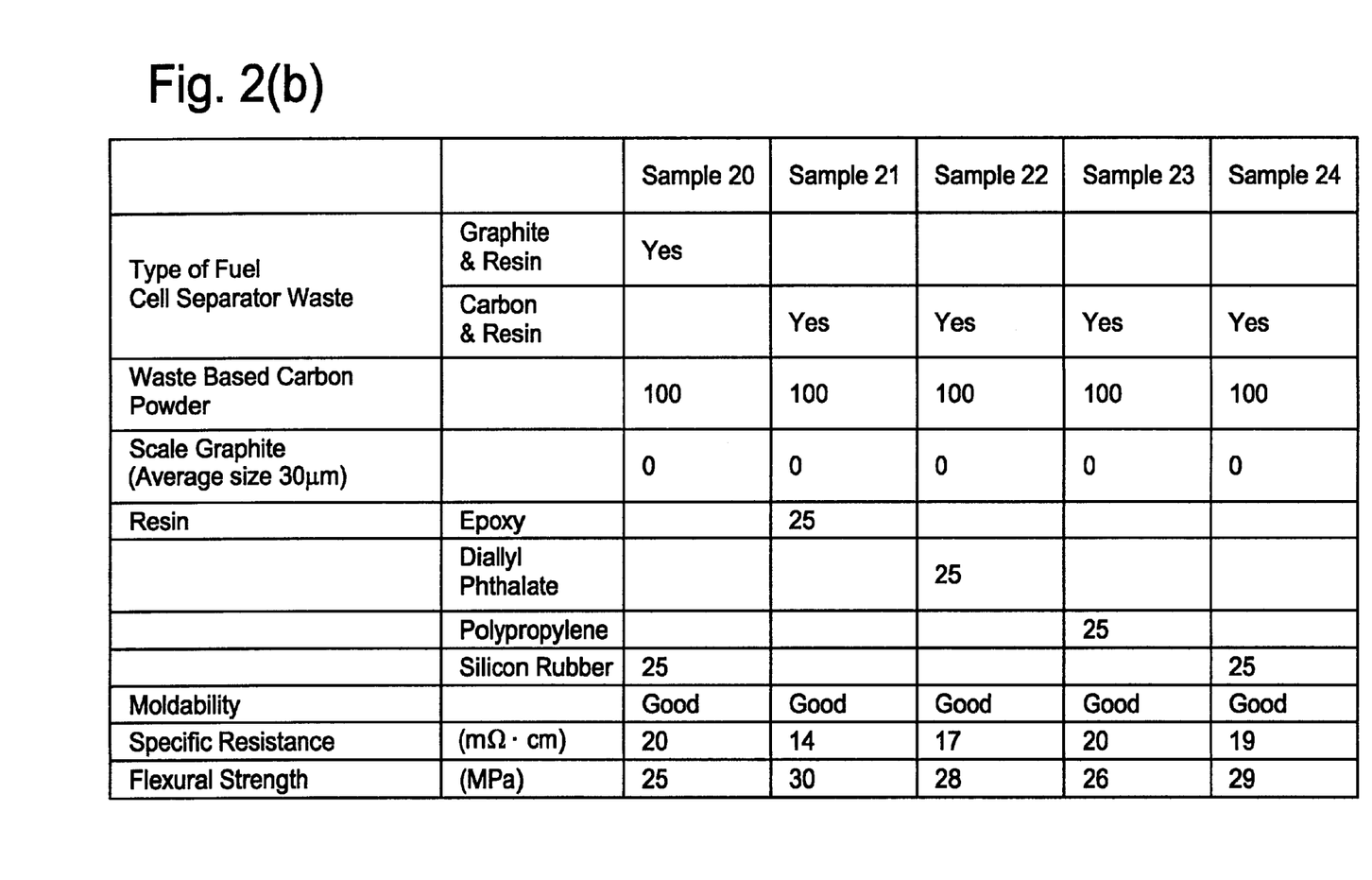

In the data table shown in FIGS. 2(a) and 2(b), each of the fuel cell separators in the samples 14–24 is directed to the material which is a mixture of the waste based carbon powder and resin. The type of resin in this experiment is different from the phenol resin in FIGS. 1(a) and (1b). In FIGS. 2(a) and 2(b), epoxy resin, diallyl phthalate resin, polypropylene, or silicon rubber is selectively used.

Similar to the experiment noted above, in the samples 14–24, the waste of fuel cell separator is crushed by a jet mill to produce the waste based carbon powder with an average grain size of 30 μm. The samples 14–20 use the carbon powder recycled from the fuel cell separator containing the graphite and resin while the samples 21–24 use the carbon powder recycled from the fuel cell separator containing the carbon and resin. The waste based carbon powder is mixed with unused scale graphite (average grain size of 30 μm). The waste based carbon powder in the overall conducive material is "100" in weight throughout the samples 14–24.

Further, the resin is mixed with the conductive material (mixture of waste based carbon powder and scale graphite) by a Henshel mixer in the ratio defined in the data tables. As noted above, one type of resin is selected for each sample from the group of epoxy resin, diallyl phthalate resin, polypropylene, and silicon rubber. The selected resin has the weight 25 relative to the weight 100 of the waste based carbon powder in the mixed material. New scale graphite is added to the samples 15–17 while no new scale graphite is added to the other samples.

The material thus prepared is undergone the molding process in the same conditions as described above, thus, the resultant fuel cell separator in each of the samples 14–24 has the same size and shape as described above. Moldability, specific resistance, and a flexural strength for each sample are measured and listed in the data tables.

All of the samples 14–24 show excellent moldability and flexural strength, and the specific resistance of each sample is low enough for the practical use in the fuel cell. Therefore, the fuel cell separators of the present invention in FIGS. 2(a) and 2(b) are comparable to fuel cell separators made solely from new material.

Sample 25–37

Figure 3A:
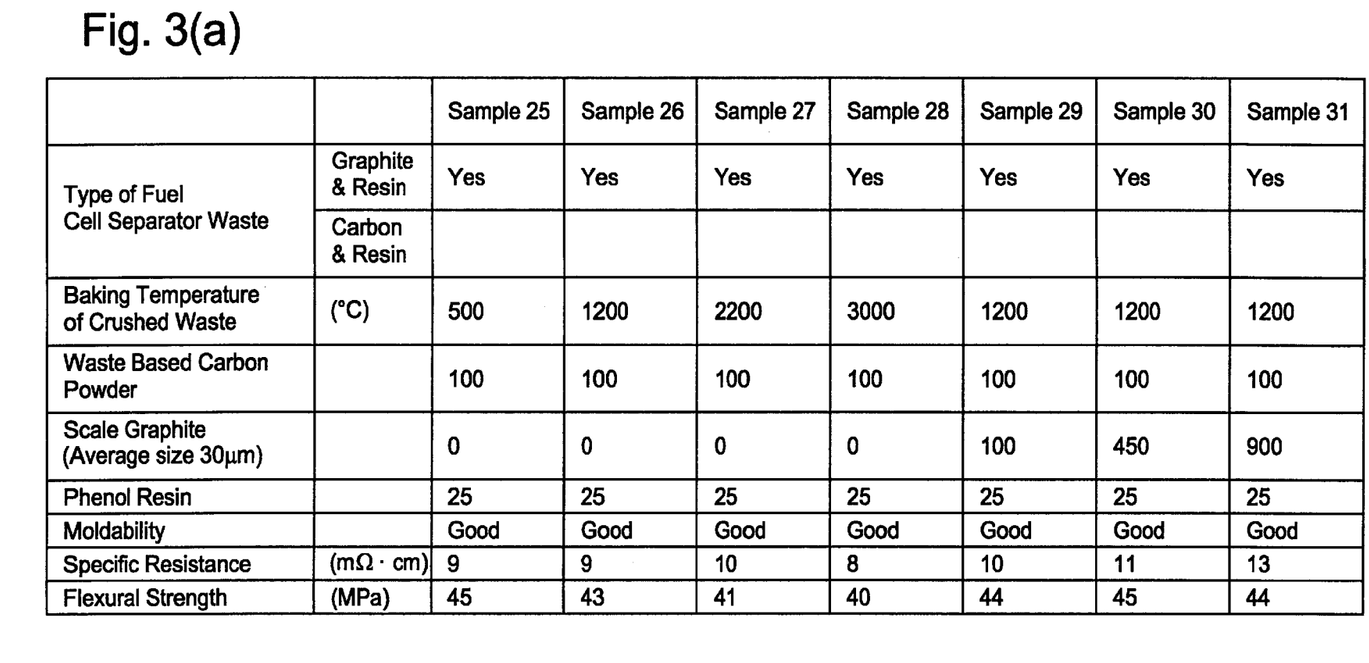
FIGS. 3A and 3B are data tables showing experimental results with respect to samples 25–37 of fuel cell separators using the material formed of carbon powder made by baking and pulverizing the waste of fuel cell separator which is mixed with phenol resin.
Figure 3B:
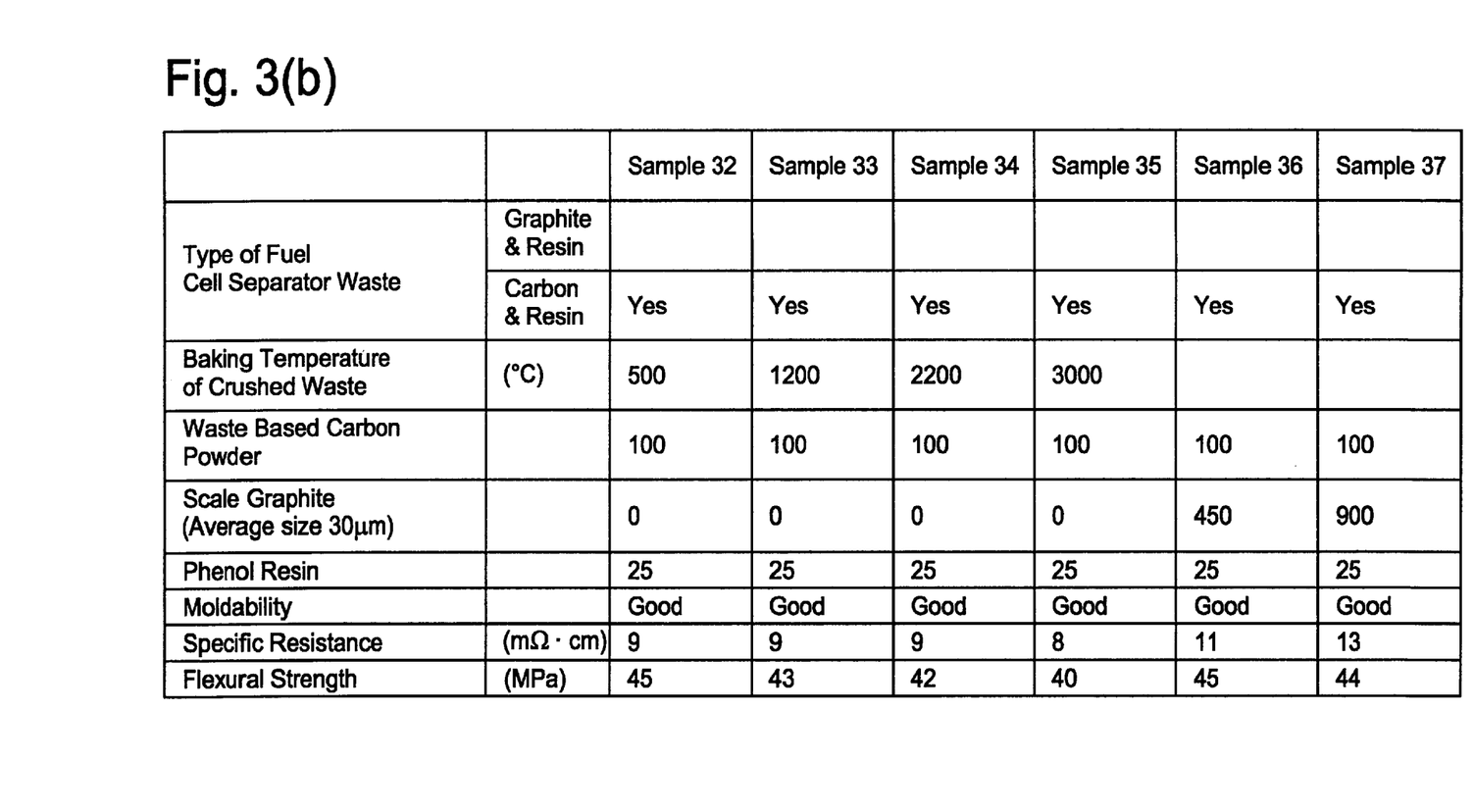

In the data table shown in FIGS. 3(a) and 3(b), the fuel cell separators in the samples 25–37 are directed to the recycled carbon powder which is baked before being mixed with resin and unused scale graphite. Namely, the waste of the fuel cell separators is pulverized with a jet mill to produce the waste based carbon powder with an average grain size of 30 μm. The samples 25–31 use the carbon powder recycled from the fuel cell separator containing the graphite and resin while the samples 32–37 use the carbon powder recycled from the fuel cell separator containing the carbon and resin.

Such waste based carbon powder is baked under the baking temperature ranging from 500° C. to 3,000° C. listed in the data tables of FIGS. 3(a) and 3(b). Then, the waste based carbon powder is mixed with unused scale graphite (average grain size of 30 μm) in the samples 29–31 and 36 and 37 in the manner that the waste based carbon powder in the overall conducive material is "100" in weight.

Further, the phenol resin is mixed with the conductive material (mixture of the waste based carbon powder after baking and the scale graphite) by a Henshel mixer in the ratio defined in the data tables. The material thus prepared is undergone the molding process in the same conditions as described above, thus, the resultant fuel cell separator in each of the samples 25–37 has the same size and shape as the other separators described above. Moldability, specific resistance, and a flexural strength for each sample are measured and listed in the data tables.

As a result, all of the samples 25–37 show excellent moldability and flexural strength, and the specific resistance of each sample is low enough for the practical use in the fuel cell. Therefore, the fuel cell separators of the present invention in FIGS. 3(a) and 3(b) are comparable to fuel cell separators made solely from new material.

As has been described in the foregoing, according to the present invention, the fuel cell separator consisting of conductive material and resin is made by using the waste of fuel cell separator consisting of conductive material and resin. The waste of fuel cell separator is pulverized to powder and is mixed with unused resin and, if necessary, conductive material such as graphite, to establish powdered material. The powdered material is molded under the predetermined molding pressure and temperature. The fuel cell separators of the present invention using the recycled material are comparable, in various aspects listed in the data tables, to fuel cell separators made solely from new material. Thus, the present invention is effective in decreasing the industrial waste involving the fuel cell separators, thereby improving environmental conditions and saving natural resources.

Further in the present invention, the baking process is conducted for the waste of fuel cell separator, either before or after the pulverizing step, under the baking temperature ranging from 500° C. to 3,000° C. As a result of which, the resin contained in the waste of fuel cell separator is changed to the carbon or graphite, i.e, the conductive material. Therefore, when using the material based on the waste of fuel cell separator, the content of the material is always known, thereby enabling to produce fuel cell separators of uniform and improved quality.

Although only a preferred embodiment is specifically illustrated and described herein, it will be appreciated that many modifications and variations of the present invention are possible in light of the above teachings and within the purview of the appended claims without departing the spirit and intended scope of the invention.

What is claimed is:

1. A method of producing a fuel cell separator, comprising the steps of:
   crushing waste of unbaked fuel cell separator containing conductive material and resin;
   supplementing unused conductive material and/or resin to the crushed waste of unbaked fuel cell separator to form powdered material; and
   molding the powdered material by a mold under predetermined molding pressure and temperature to form the fuel cell separator.

2. A method of producing a fuel cell separator as defined in claim 1, wherein said resin supplemented is in a weight ratio ranging from 2.4–40%.

3. A method of producing a fuel cell separator as defined in claim 1, further comprising a step of baking said waste of said unbaked fuel cell separator, either before or after said crushing step, under baking temperature ranging from 500° C. to 3,000°C.

4. A method of producing a fuel cell separator as defined in claim 3, wherein carbon powder in said powdered material after the baking step has an average diameter ranging from 10 μm to 100 μm.

5. A method of producing a fuel cell separator as defined in claim 1, wherein said step of forming the powdered material includes a step of mixing said powdered material made from the waste of fuel cell separator with resin by a mixing machine.

6. A method of producing a fuel cell separator as defined in claim 1, wherein said step of forming the powdered material includes a step of mixing said powdered material made from the waste of fuel cell separator with resin and unused carbon powder by a mixing machine.

7. A method of producing a fuel cell separator as defined in claim 3, wherein said powdered material made from the waste has an average diameter of about 30 μm.

8. A method of producing a fuel cell separator as defined in claim 1, further comprising a step of adding solvent to the powdered material to granulate the powdered material.

9. A method of producing a fuel cell separator as defined in claim 1, wherein an environmental gas is supplied to said powdered material in said baking step.

* * * * *